United States Patent
Sasaki et al.

(10) Patent No.: US 7,456,378 B2
(45) Date of Patent: Nov. 25, 2008

(54) CONFOCAL MICROSCOPE AND MULTIPHOTON EXCITATION MICROSCOPE

(75) Inventors: Hiroshi Sasaki, Tokyo (JP); Eiji Yokoi, Tokyo (JP); Tatsuo Nakata, Hino (JP)

(73) Assignee: Olympus Corporation, Tokyo (JP)

( * ) Notice: Subject to any disclaimer, the term of this patent is extended or adjusted under 35 U.S.C. 154(b) by 2 days.

(21) Appl. No.: 11/805,378

(22) Filed: May 22, 2007

(65) Prior Publication Data

US 2007/0272843 A1  Nov. 29, 2007

(30) Foreign Application Priority Data

May 25, 2006  (JP) .............................. 2006-145075

(51) Int. Cl.
*H01J 40/14* (2006.01)
*G02B 7/04* (2006.01)
*G02B 21/00* (2006.01)

(52) U.S. Cl. .................... 250/201.3; 250/234; 356/607

(58) Field of Classification Search ............. 250/201.2, 250/201.3, 201.4, 234, 216, 208.1; 356/606–608; 359/368, 385, 389
See application file for complete search history.

(56) References Cited

U.S. PATENT DOCUMENTS 5,587,832 A    12/1996  Krause
6,459,484 B1 *  10/2002  Yokoi .......................... 356/318

2004/0113059 A1    6/2004  Kawano

FOREIGN PATENT DOCUMENTS

JP    08-271792 A    10/1996

OTHER PUBLICATIONS

IM, Kang-Bin, et al, "Simple high-speed confocal line-scanning microscope" Optics Express, vol 13, No. 13, Jun. 27, 2005, pp. 5151-5156, XP002445705.
"Electronically scanned Confocal Imaging System" IBM Technical Disclosure Bulletin, IBM Corp. New York, vol. 36, No. 6B, Jun. 1, 1993, pp. 261-262, XP000377375, ISSN: 0018-8689.

* cited by examiner

*Primary Examiner*—Kevin Pyo
(74) *Attorney, Agent, or Firm*—Frishauf, Holtz, Goodman & Chick, P.C.

(57) ABSTRACT

The invention provides a confocal microscope comprising a light source; a light scanning unit; an array device; a line-beam generating unit for imaging illumination light in the form of a straight line extending, on the array device, in a direction intersecting the scanning direction of the light scanning unit; an objective lens for imaging the illumination light reflected or transmitted at the array device on a specimen; a beamsplitter, between the array device and the light scanning unit, for splitting off from the illumination light detection light from the specimen; a two-dimensional image-acquisition unit for acquiring the split off detection light; and a control unit for controlling the light scanning unit and the array device, wherein the array device is disposed in an optically conjugate positional relationship with a focal plane of the objective lens, and the control unit performs control so as to synchronize the light scanning unit and the array device.

8 Claims, 10 Drawing Sheets

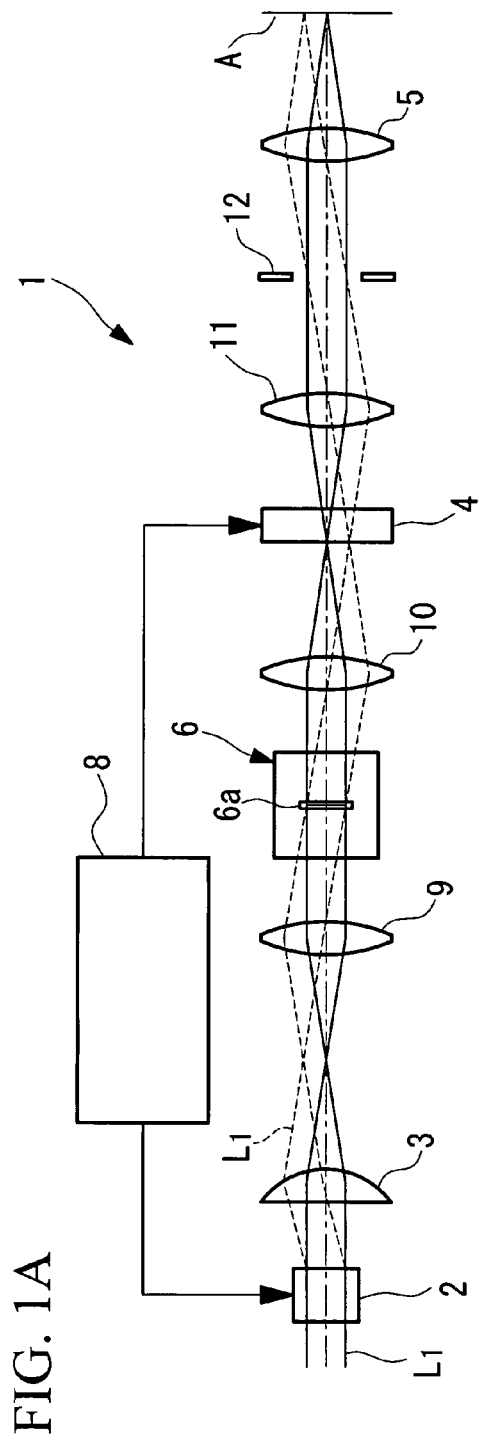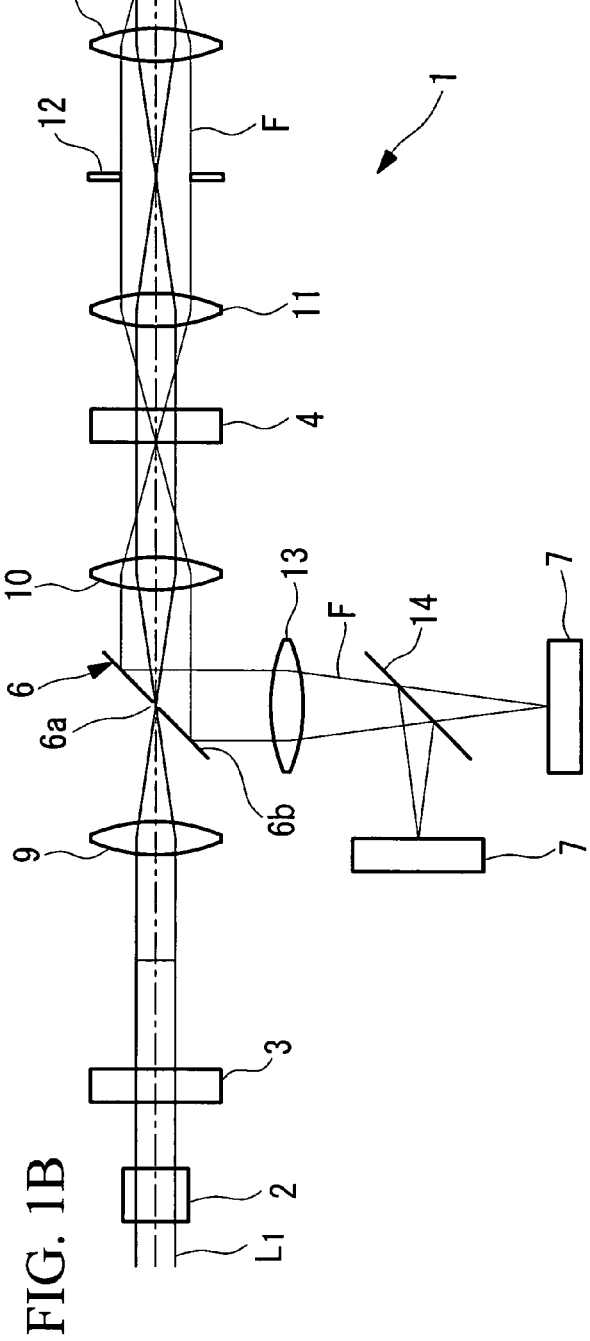

SCANNING DIRECTION OF STRAIGHT-LINE-SHAPED BEAM

SCANNING DIRECTION OF STRAIGHT-LINE-SHAPED BEAM

POSITION OF STRAIGHT-LINE-SHAPED BEAM

SCANNING DIRECTION OF STRAIGHT-LINE-SHAPED BEAM

POSITION OF STRAIGHT-LINE-SHAPED BEAM

SCANNING DIRECTION OF STRAIGHT-LINE-SHAPED BEAM

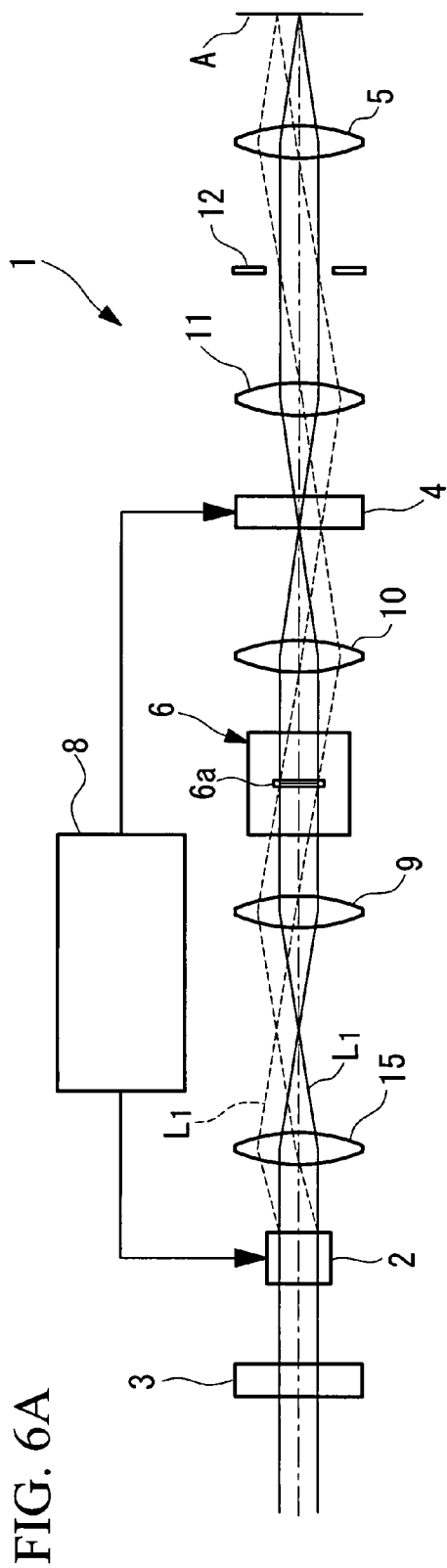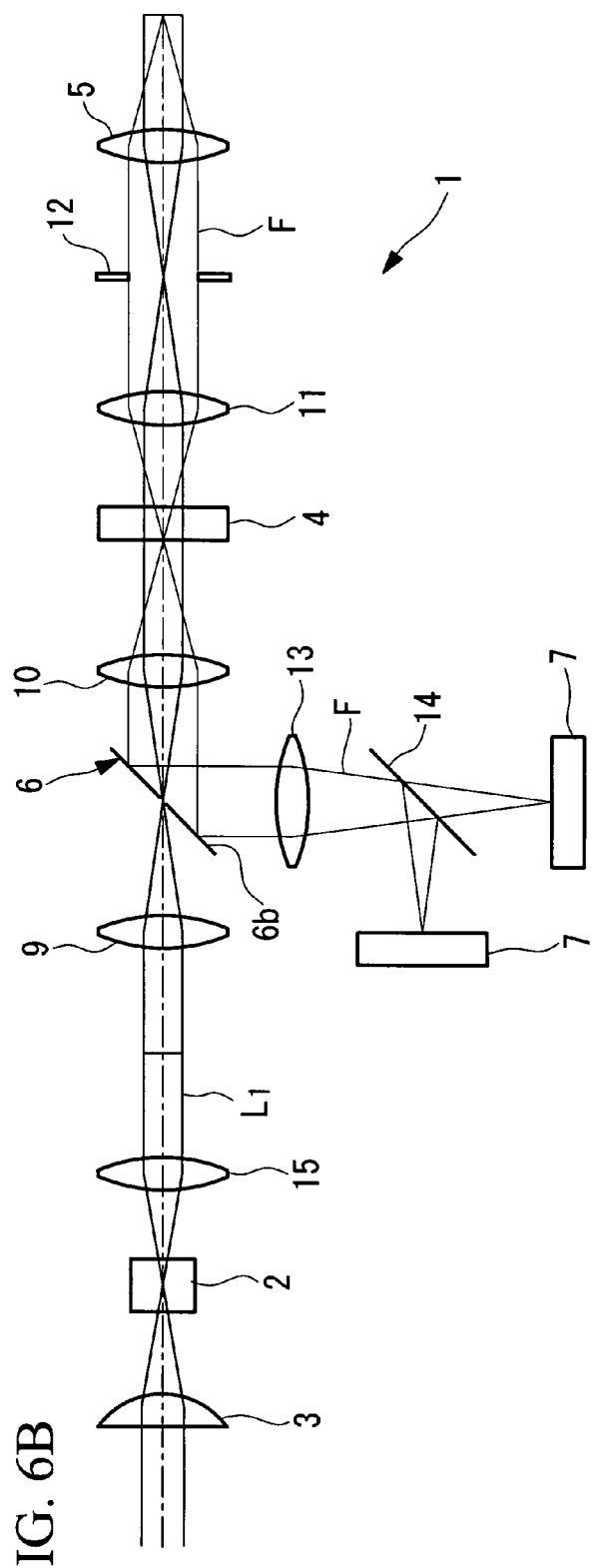
FIG. 6A
FIG. 6B

SCANNING DIRECTION OF STRAIGHT-LINE-SHAPED BEAM

CONFOCAL MICROSCOPE AND MULTIPHOTON EXCITATION MICROSCOPE

BACKGROUND OF THE INVENTION

1. Field of the Invention

The present invention relates to a confocal microscope and to a multiphoton excitation microscope.

This application is based on Japanese Patent Application No. 2006-145075, the content of which is incorporated herein by reference.

2. Description of Related Art

A confocal microscope according to the related art is disclosed, for example, in Japanese Unexamined Patent Application, Publication No. HEI-8-271792 and US Patent Application No. 2004/0113059.

Japanese Unexamined Patent Application, Publication No. HEI-8-271792 discloses a confocal microscope in which laser light is two-dimensionally scanned with two galvanometer mirrors, and fluorescence returning via the galvanometer mirrors is detected with a light detector such as a photomultiplier tube.

US Patent Application No. 2004/0113059 discloses a confocal microscope in which a digital mirror array device and a one-axis galvanometer mirror are provided in a common light path of illumination light and detection light, and a beam having a straight-line shape in cross-section is imaged on the digital mirror array device. Laser light is two-dimensionally scanned on the surface of a specimen based on the on/off operation of the digital mirror array device and the rocking motion of the galvanometer mirrors, and fluorescence returning via the digital mirror array device and the galvanometer mirror is detected by a one-dimensional line sensor.

However, when the laser light is two-dimensionally scanned with the galvanometer mirror, because the driving speed of the galvanometer mirror is delayed, a comparatively long time is required for acquiring one single image, which is not compatible with observing a fast response of the specimen.

Also, when the fluorescence is emitted from the specimen surface and returns via the galvanometer mirror, the focal position of the fluorescence focused on the light detector or the line sensor does not move, and therefore, when constructing an image, it is necessary to synchronize the light detector or the line sensor with the scanning position of the galvanometer mirror and/or the digital mirror array device. Therefore, it is necessary to perform complicated control of the light detector or the line sensor, and it is thus not possible to directly use, for example, a commercially available two-dimensional CCD camera.

BRIEF SUMMARY OF THE INVENTION

The present invention provides a confocal microscope and a multiphoton excitation microscope which can acquire a high-resolution confocal image or multiphoton-excitation image and which can use a commercially available CCD camera.

A first aspect of the present invention is a confocal microscope comprising a light source; a light scanning unit configured to scan illumination light from the light source in one direction on a specimen; an array device in which are two-dimensionally arrayed a plurality of elements whose light reflecting or transmitting state can be electrically controlled; a line-beam generating unit configured to image the illumination light from the light source in the form of a line extending, on the array device, in a direction intersecting a scanning direction of the light scanning unit; an objective lens configured to image the illumination light reflected or transmitted at the array device on the specimen; a beamsplitter, between the array device and the light scanning unit, configured to split off from the illumination light detection light returning from the specimen via the objective lens and the array device; a two-dimensional image-acquisition unit configured to acquire the detection light split off by the beamsplitter; and a control unit configured to control the light scanning unit and the array device, wherein the array device is disposed in an optically conjugate positional relationship with a focal plane of the objective lens, and the control unit performs control so as to synchronize the light scanning unit and the array device.

According to the aspect described above, the illumination light emitted from the light source is scanned in one direction by the operation of the light scanning unit and is imaged onto the elements of the array device in the form of a straight line extending in a direction intersecting the scanning direction of the light scanning unit by the operation of the line-beam generating unit. The illumination light reflected or transmitted at the elements of the array device is focused by the objective lens and is imaged onto the specimen, which is disposed in an optically conjugate positional relationship with the array device.

Therefore, the specimen is irradiated with the entire beam imaged in the form of a straight line or a portion of the beam, according to the state of the elements. The detection light, such as reflection light reflected at the specimen or fluorescence generated by exciting the specimen, returns via the objective lens and the array device, is split off from the illumination light by the beamsplitter before it returns to the light scanning unit, and is detected by the two-dimensional image-acquisition unit. Returning the light via the array device allows the elements on the array device to function as a confocal pinhole, and therefore, it is possible to acquire a clear image of the specimen located at the focal plane of the objective lens.

In this case, because the detection light does not return to the light scanning unit but is instead split off from the illumination light, when the illumination light is scanned in one direction by the light scanning unit, the detection light is also scanned in one direction on the two-dimensional image-acquisition unit. Because the array device and the light scanning unit are synchronously controlled by the control unit, the illumination position on the specimen and the detection position of the detection light on the two-dimensional image-acquisition unit are in one-to-one correspondence. Therefore, it is possible to acquire two-dimensional image information without performing any special or complicated control in the two-dimensional image-acquisition unit, and therefore, it is possible to employ a commercially available two-dimensional image-acquisition unit, such as a CCD camera.

In the aspect of the invention described above, the beamsplitter may be disposed in an optically conjugate position with respect to a pupil position of the objective lens and may spatially separate the illumination light and the detection light.

With this configuration, compared to a case in which the light is separated based on wavelength, for example, using a dichroic mirror, it is possible to separate the illumination light and the detection light with a simple configuration, like a slit, independently of wavelength.

In the aspect of the invention described above, the control unit may control the array device so that elements where the straight-line-shaped beam is imaged and elements close thereto are in the same operating state.

With this configuration, by placing the plurality of elements close to the line beam in the same operating state, it is possible to increase the pinhole diameter, which allows a brighter image to be acquired.

In the aspect of the invention described above, the line-beam generating unit may be formed of a cylindrical lens, and the cylindrical lens may be disposed on the light source side of the light scanning unit.

With this configuration, it is possible to keep the illumination light incident on the cylindrical lens stationary, and therefore, only good on-axis performance of the cylindrical lens need be ensured. Therefore, the optical design can be simplified.

In the aspect of the invention described above, after the control unit activates only some of the elements corresponding to the position where the straight-line-shaped beam is imaged on the array device and scans the straight-line-shaped beam, the control unit may activate elements different from the above-mentioned activated elements and scan the straight-line-shaped beam.

With this configuration, it is possible to achieve a confocal effect also in the longitudinal direction of the line beam, which allows a high-resolution image to be acquired.

The aspect of the invention described above may further comprise a wavefront converting device, between the array device and the objective lens, configured to adjust a focal position on the specimen in an optical axis direction.

With this configuration, it is possible to adjust the focal position on the specimen in the optical axis direction using the wavefront conversion device, which allows three-dimensional image information to be acquired.

The aspect of the invention described above may further comprise a second light scanning unit configured to scan stimulus light, for irradiating the specimen, in one direction on the specimen; a second array device in which are two-dimensionally arrayed a plurality of elements whose light reflecting or transmitting state can be electrically controlled; a second line-beam generating unit configured to image, on the second array device, the stimulus light in the form of a straight line extending in a direction intersecting the scanning direction of the second light scanning unit; an optical component configured to establish a conjugate relationship between the second array device and a focal plane of the objective lens; and a second control unit configured to control the operating states of each element in the second array device, wherein by scanning the line beam with the second light scanning unit, the stimulus light is radiated at positions on the specimen that correspond to activated elements in the second array device.

With this configuration, the optical stimulus can be quickly applied to any plurality of points (individual points or areas), and it is therefore possible to observe a fast response of the specimen to the optical stimulus.

A second aspect of the present invention is a multiphoton excitation microscope comprising an ultrashort pulsed laser light source; a light scanning unit configured to scan ultrashort pulsed laser light from the ultrashort pulsed laser light source in one direction on a specimen; an array device in which are two-dimensionally arrayed a plurality of elements whose light reflecting or transmitting state can be electrically controlled; a line-beam generating unit configured to image the ultrashort pulsed laser light from the ultrashort pulsed laser light source in the form of a straight line extending, on the array device, in a direction intersecting the scanning direction of the light scanning unit; an objective lens configured to image, on the specimen, the ultrashort pulsed laser light reflected or transmitted at the array device; a beamsplitter, between the objective lens and the array device, configured to split off fluorescence generated in the specimen and collected by the objective lens; a two-dimensional image-acquisition unit configured to acquire the fluorescence split off by the beamsplitter; and a control unit configured to control the light scanning unit and the array device, wherein the control unit performs control so as to synchronize the light scanning unit and the array device.

According to the aspect described above, the ultrashort pulsed laser light emitted from the ultrashort pulsed laser light source is scanned in one direction by the operation of the light scanning unit and is imaged onto the elements of the array device in the form of a straight line extending in a direction intersecting the scanning direction of the light scanning unit by the operation of the line-beam generating unit. The ultrashort pulsed laser light reflected or transmitted by the elements of the array device is focused by the objective lens and is imaged at the focal plane of the objective lens, which is disposed in an optically conjugate positional relationship with the array device.

As a result, a multiphoton excitation effect is produced in the specimen and fluorescence is generated only in a thin region in the vicinity of the focal plane of the objective lens. The generated fluorescence is collected by the objective lens, is split off by the beamsplitter before reaching the array device, and is acquired by the two-dimensional image-acquisition unit.

Because fluorescence is produced only in a thin region along the focal plane due to the multiphoton excitation effect, it is possible to acquire a clear fluorescence image of the specimen.

In this case, because the detection light is split off from the ultrashort pulsed laser light without returning to the array device, when the ultrashort pulsed laser light is scanned in one direction by the light scanning unit, the detection light is also scanned in one direction on the two-dimensional image-acquisition unit. Because the array device and the light scanning unit are synchronously controlled by the control unit, the irradiation position of the ultrashort pulsed laser light on the specimen and the detection position of the fluorescence on the two-dimensional image-acquisition unit are in one-to-one correspondence. Therefore, it is possible to acquire a two-dimensional fluorescence image without conducting special or complicated control in the two-dimensional image-acquisition unit, and therefore, it is possible to employ a commercially available two-dimensional image-acquisition unit, such as a CCD camera.

The present invention affords an advantage in that it is possible to acquire a high-resolution confocal image or multiphoton excitation image and it is not necessary to perform complicated control of a detector, thus allowing a commercially available CCD camera to be used.

BRIEF DESCRIPTION OF THE SEVERAL VIEWS OF THE DRAWINGS

FIGS. 1A and 1B are optical diagrams showing the principal components of a confocal microscope according to an embodiment of the present invention, wherein FIG. 1A is an elevational view and FIG. 1B is a plan view.

FIG. 2A shows an operating state in which substantially an entire column at the left side is turned on, and FIG. 2B shows an operating state in which substantially an entire column near the center is turned on.

FIG. 3A and FIG. 3C show an operating state in which part of the column at the left side is turned on, and FIG. 3B and FIG. 3D show an operating state in which part of the row near the center is turned on.

FIG. 4A and FIG. 4B show operating states, similar to FIG. 2A and FIG. 2B, in which mirror elements surrounding the irradiation position of the laser light are also turned on.

FIG. 5A and FIG. 5B show operating states, similar to FIGS. 3A to 3D, in which mirror elements surrounding the irradiation position of the laser light are also turned on.

FIG. 6A and FIG. 6B show a first modification of the confocal microscope shown in FIG. 1A and FIG. 1B.

FIG. 7A and FIG. 7B are optical diagrams showing the principal components of a multiphoton excitation microscope according to an embodiment of the present invention, wherein FIG. 7A is an elevational view and FIG. 7B is a plan view.

FIG. 8A and FIG. 8B show a variable-light-stimulus confocal microscope, as a second modification of the confocal microscope shown in FIG. 1A and FIG. 1B, wherein FIG. 8A is an elevational view and FIG. 8B is a plan view.

FIG. 10A and FIG. 10B show, as a third modification of the confocal microscope shown in FIG. 1A and FIG. 1B, an example in which an image guide is disposed at the focal plane of an objective lens, wherein FIG. 10A is an elevational view and FIG. 10B is a plan view.

DETAILED DESCRIPTION OF THE INVENTION

Figure 2A:
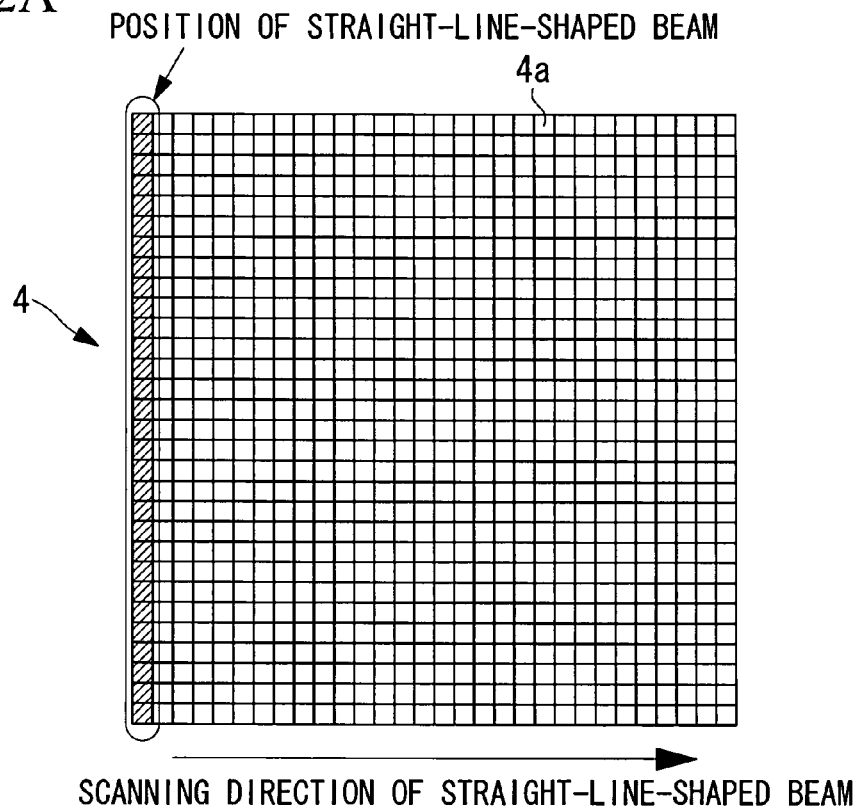
FIGS. 2A and 2B are diagrams for explaining the operating states of a digital mirror array device in the confocal microscope shown in FIG. 1A and FIG. 1B.

A confocal microscope 1 according to an embodiment of the present invention will be described below with reference to the drawings.

The confocal microscope 1 according to this embodiment is a laser-scanning confocal microscope.

As shown in FIG. 1A and FIG. 1B, the confocal microscope 1 according to this embodiment includes a laser light source (light source; not shown in the drawing) for generating laser light $L_1$; a light scanning unit 2 for one-dimensionally scanning the laser light $L_1$ from the light source in one direction; a cylindrical lens (line-beam generating unit) 3 for converting the laser light $L_1$ scanned by the light scanning unit 2 into a beam imaged in the form of a straight line; a digital mirror array device (array device) 4 in which a plurality of mirror elements (elements) 4a that can be switched on and off are two-dimensionally arrayed; an objective lens 5 for focusing the laser light $L_1$ reflected by the mirror elements 4a in the digital mirror array device 4 (see FIG. 2A and FIG. 2B) to image it at a specimen A; a beamsplitter 6 for splitting off from the laser light $L_1$ fluorescence F returning from the specimen A; two-dimensional CCD cameras (two-dimensional image-acquisition units) 7 for imaging the split-off fluorescence F; and a control unit 8 for controlling the light scanning unit 2 and the digital mirror array device 4. In order to simplify the drawings, in FIG. 1A and FIG. 1B, the reflective-type digital mirror array device 4 is replaced with a transmissive type.

The light scanning unit 2 is, for example, an acousto-optic scanner. By changing the diffraction direction according to the frequency of an input ultrasonic wave based on a control signal from the control unit 8, the light scanning unit 2 changes the emission direction of the incident laser light $L_1$, thereby enabling scanning in one direction.

The digital mirror array device 4 is disposed in a conjugate positional relationship with respect to the focal plane of the objective lens 5. Therefore, with the focal plane of the objective lens 5 located inside the specimen A, when the straight-line-shaped laser light $L_1$ is scanned in one direction by operating the light scanning unit 2, the laser light $L_1$ is scanned in one direction on the specimen A and the digital mirror array device 4.

Figure 2B:
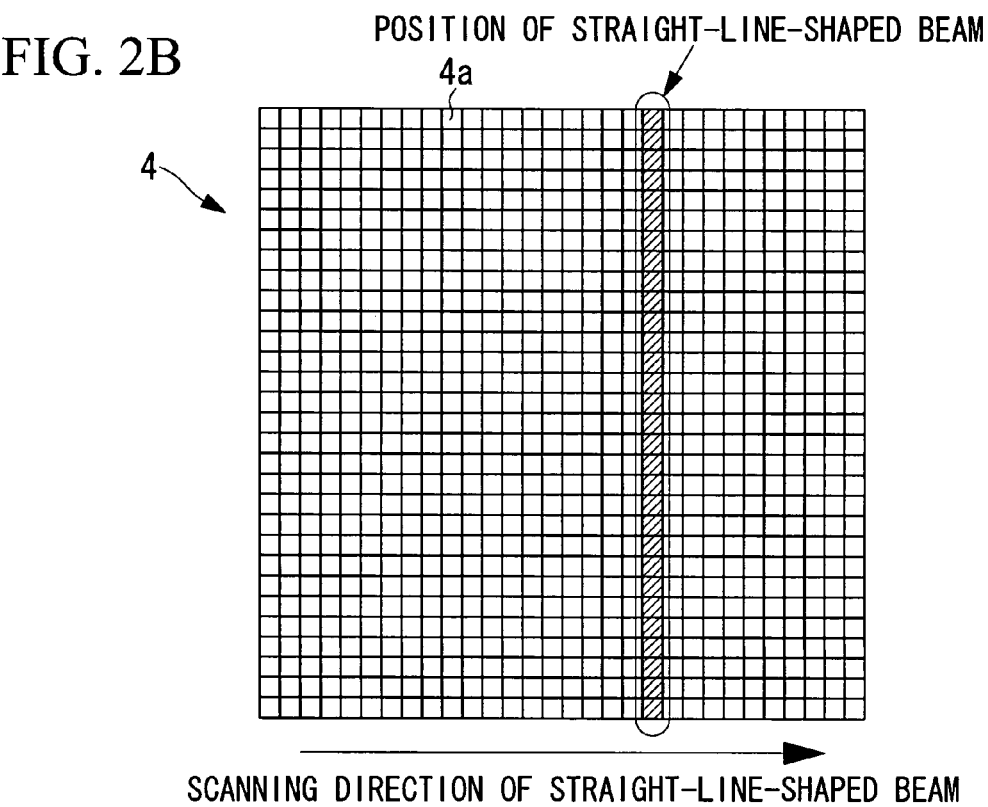

As shown in FIG. 2A and FIG. 2B, the digital mirror array device 4 is formed of the plurality of two-dimensionally arrayed mirror elements 4a, which can be switched on and off. The laser light $L_1$ incident on the mirror elements 4a that are set in the on state is directed towards the specimen A upon reflection by those mirror elements 4a. The laser light $L_1$ which is incident on the mirror elements 4a that are set in the off state, upon reflection by those mirror elements 4a, is directed in a different direction in which it is not incident on the specimen A.

As indicated by the hatching in FIG. 2A and FIG. 2B, by turning on one column of the mirror elements 4a corresponding to the image-forming position of the straight-line-shaped laser beam $L_1$, it is possible to direct all of the incident laser light $L_1$ towards the specimen A. The arrow in the drawings indicates a moving direction of the column of mirror elements 4a that are switched on (the scanning direction of the laser light $L_1$ by the light scanning unit 2).

As shown by the hatching in FIGS. 3A to 3D, by turning on some of the mirror elements 4a in the column of mirror elements 4a corresponding to the image-forming position of the straight-line-shaped laser light $L_1$, it is possible to direct some of the incident laser light $L_1$ towards the specimen A.

Returning to FIG. 1A and FIG. 1B, relay lenses 9 and 10 are disposed between the cylindrical lens 3 and the beamsplitter 6, and between the beamsplitter 6 and the digital mirror array device 4, respectively. The relay lenses 9 and 10 are standard spherical-surface lenses, and therefore, the laser light $L_1$ imaged in the form of a line by the cylindrical lens 3 is relayed by the relay lens 9 to be re-imaged at the beamsplitter 6, and is then relayed by the relay lens 10 to be re-imaged on the digital mirror array device 4.

An image-forming lens 11 is disposed between the digital mirror array device 4 and the objective lens 5. The image-forming lens 11 images the laser light $L_1$ reflected at the digital mirror array device 4 at a pupil position 12 of the objective lens 5.

The beamsplitter 6 is disposed at an optically conjugate position with respect to the pupil position 12 of the objective lens 5 and is provided, at the on-axis position thereof, with a slit 6a for transmitting the laser light $L_1$ converted to a line shape by the cylindrical lens 3 and relayed by the relay lens 9. A reflective surface 6b is provided at the specimen A side of the beamsplitter 6 for reflecting the fluorescence F returning from the specimen A.

The fluorescence F reflected by the beamsplitter 6 is focused by a focusing lens 13, is separated into each wavelength by a dichroic mirror 14, and is acquired by two two-dimensional CCDs 7 in which image-acquisition surfaces are disposed at the respective image-forming positions.

The control unit 8 synchronously controls the light scanning unit 2 and the digital mirror array device 4. As described above, the digital mirror array device 4 and the focal plane of the objective lens 5 are disposed in an optically conjugate positional relationship. The incident position of the laser light $L_1$ on the digital mirror array device 4 is changed by operating the light scanning unit 2. Therefore, the control unit 8 can reflect the laser light $L_1$ incident on the digital mirror array device 4 towards the specimen A by synchronizing the scanning of the laser light $L_1$ by the light scanning unit 2 and the turning on of the mirror elements 4a in the digital mirror array device 4.

The operation of the confocal microscope 1 according to this embodiment, having such a configuration, will be described below.

To acquire a fluorescence image of the specimen A using the confocal microscope 1 according to this embodiment, the laser light $L_1$ is emitted from the laser light source (not shown in the drawing). After passing via the acousto-optic scanner 2 in the form of a substantially collimated beam, the laser light $L_1$ emitted from the laser light source is imaged in the form of a straight line, extending in one direction, by the cylindrical lens 3 and is relayed by the relay lens 9, whereupon it is re-imaged in the form of a straight line extending in a direction orthogonal to the direction mentioned above.

The beamsplitter 6 is disposed at this re-imaging position. Since the beamsplitter 6 is provided with the slit 6a for transmitting the re-imaged laser light $L_1$, all of the laser light $L_1$ passes through the slit 6a in the beamsplitter 6, is relayed by the relay lens 10, and is re-imaged in the form of a straight line extending in the same direction as the image at the image-forming position of the cylindrical lens 3. The digital mirror array device 4 is disposed at this re-imaging position; therefore, by turning on the mirror elements 4a that match the image-forming position of the laser light $L_1$ with the control unit 8, it is possible to reflect the incident laser light $L_1$ to direct it towards the specimen A. FIG. 2A shows commencement of scanning of the line-shaped beam, and FIG. 2B shows the operation during scanning.

After being imaged at the pupil position 12 of the objective lens 5 by the image-forming lens 11, the laser light $L_1$ directed towards the specimen A is focused by the objective lens 5 and is imaged at the focal plane thereof. Because the focal plane of the objective lens 5 and the digital mirror array device 4 are disposed in an optically conjugate positional relationship, the laser light $L_1$ imaged at the focal plane also forms a straight-line-shaped image extending in the same direction as the laser light $L_1$ imaged on the digital mirror array device 4.

In the specimen A, the fluorescence F is generated by exciting a fluorescent substance contained in the specimen A at each position irradiated by the laser light $L_1$. The generated fluorescence F is emitted in all directions; a portion thereof is collected by the objective lens 5, is substantially collimated, passes through the pupil position 12 of the objective lens 5, and is imaged at the digital mirror array device 4 by the image-forming lens 11. Because the digital mirror array device 4 and the focal plane of the objective lens 5 are disposed in an optically conjugate positional relationship, the mirror elements 4a that are turned on function as a confocal pinhole, and therefore, only the fluorescence F that is produced from the irradiation position of the laser light $L_1$ on the focal plane of the objective lens 5 is reflected by the mirror elements 4a that are turned on.

The fluorescence F reflected by the turned on mirror elements 4a in the digital mirror array device 4 is incident on the beamsplitter 6 after being converted to a substantially collimated beam by the relay lens 10, and is reflected by the reflective surface 6b of the beamsplitter 6. Because the slit 6a is provided in the beamsplitter 6, part of the fluorescence is transmitted through the slit 6a, but by forming the slit 6a to be sufficiently small, it is possible to reflect most of the fluorescence F. Accordingly, the fluorescence F is split off from the laser light $L_1$.

After being focused by the focusing lens 13 and split into each wavelength by the dichroic mirror 14, the fluorescence F split off from the laser light $L_1$ is acquired by the two-dimensional CCDs 7. Because the image-acquisition surfaces of the two-dimensional CCDs 7 are also in an optically conjugate positional relationship with the focal plane of the objective lens 5, a straight-line-shaped fluorescence image generated at the focal plane of the objective lens 5 is directly acquired by the two-dimensional CCDs 7 as straight-line-shaped fluorescence images.

In this case, when the laser light $L_1$ is scanned by operating the light scanning unit 2, the straight-line-shaped images on the digital mirror array device 4 and the focal plane of the objective lens 5 are moved in a direction orthogonal to the direction of those images. On the other hand, because the beamsplitter 6 is disposed in an optically conjugate positional relationship with the pupil position 12 of the objective lens 5, the image of the laser light $L_1$ formed at the beamsplitter 6 does not move, even though the light scanning unit 2 is moving, and is always coincident with the slit 6a.

Thus, because the control unit 8 synchronously controls the digital mirror array device 4 and the light scanning unit 2 in this embodiment, the mirror elements 4a that correspond to the image-forming position on the digital mirror array device 4, which moves according to the operation of the light scanning unit 2, are switched on. Therefore, the laser light $L_1$ scanned by the operation of the light scanning unit 2 is always reflected by the digital mirror array device 4, and it is thus possible to move the laser light $L_1$ imaged in the form of a straight line in the focal plane of the objective lens 5 in a direction orthogonal to the longitudinal direction thereof.

Thus, on the two-dimensional CCDs 7, the image-forming positions of the fluorescence F returning from the specimen A are moved in directions orthogonal to the longitudinal direction of the fluorescence images by operating the light scanning unit 2. Therefore, by setting the image acquisition time of the two-dimensional CCDs 7 to be sufficiently longer than the scanning time of the light scanning unit 2, it is possible to acquire a two-dimensional fluorescence image of the specimen A.

With the confocal microscope 1 according to this embodiment, it is possible to acquire a two-dimensional fluorescence image merely by scanning the laser light $L_1$ imaged in the form of a straight line in one direction with the light scanning unit 2, which is formed of an acousto-optic scanner. Therefore, compared with a conventional confocal microscope in which two-dimensional scanning is achieved with two galvanometer mirrors, it is possible to acquire a two-dimensional fluorescence image more quickly. Accordingly, an advantage is afforded in that it is possible to observe a fast response of the specimen without missing it.

With the confocal microscope 1 according to this embodiment, because the control unit 8 synchronously controls the light scanning unit 2 and the digital mirror array device 4, it is not necessary to perform special or complicated control for the two-dimensional CCDs 7, which affords an advantage in that it is possible to use commercially available CCDs. Accordingly, the confocal microscope 1 can be constructed at low cost.

In the confocal microscope 1 according to this embodiment, the beamsplitter 6 for splitting the laser light $L_1$ and the fluorescence F is a component that spatially separates the light using the slit 6a and the reflective surface 6b. Therefore, an advantage is afforded in that it is possible to construct it more simply and at lower cost than a beamsplitter that splits the light based on wavelength, such as a dichroic mirror.

In the confocal microscope 1 according to this embodiment, substantially one column of the mirror elements 4a of the digital mirror array device 4 is turned on so as to reflect all of the straight-line-shaped laser light $L_1$ imaged by the cylindrical lens 3. In addition, when operating the light scanning unit 2 to scan the laser light $L_1$, the column of mirror elements 4a that is turned on in the digital mirror array device 4 is sequentially moved.

Instead of this, however, by turning on only some of the mirror elements 4a where the straight-line-shaped laser light $L_1$ is imaged, as shown in FIG. 3A to FIG. 3D, it is possible to irradiate the specimen A with one or more spots of light.

Figure 3A:
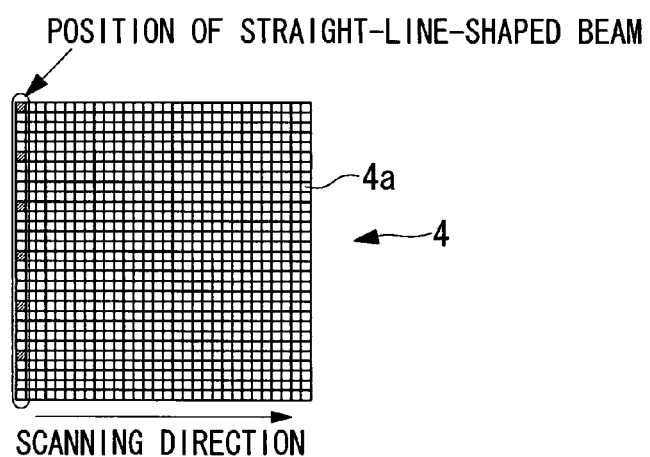
FIGS. 3A to 3D are diagrams for explaining operating states of the digital mirror array device in the confocal microscope shown in FIG. 1A and FIG. 1B.
Figure 3B:
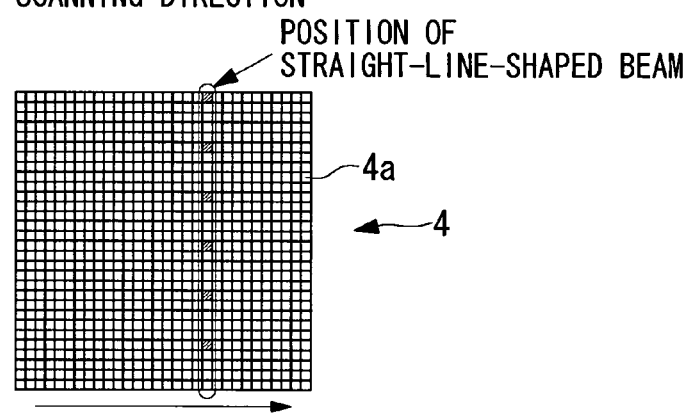
Figure 3C:
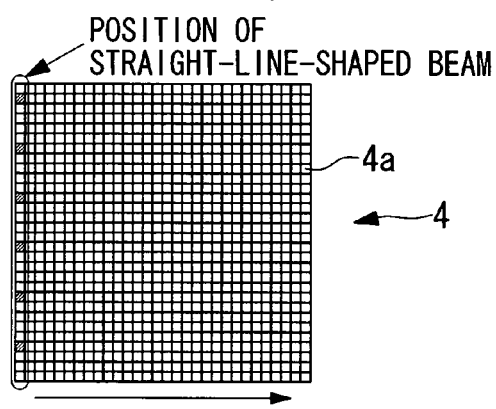
Figure 3D:
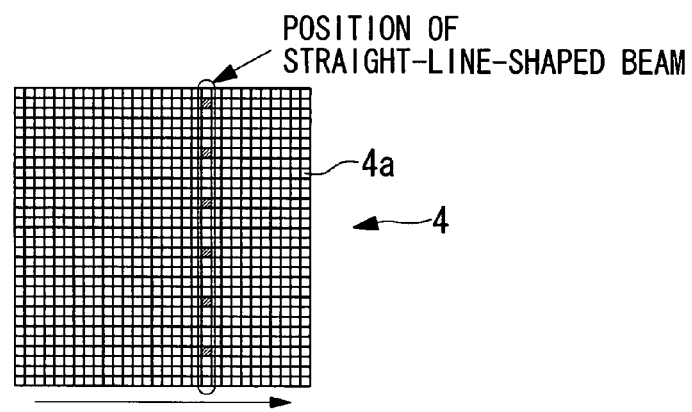
Figure 4A:
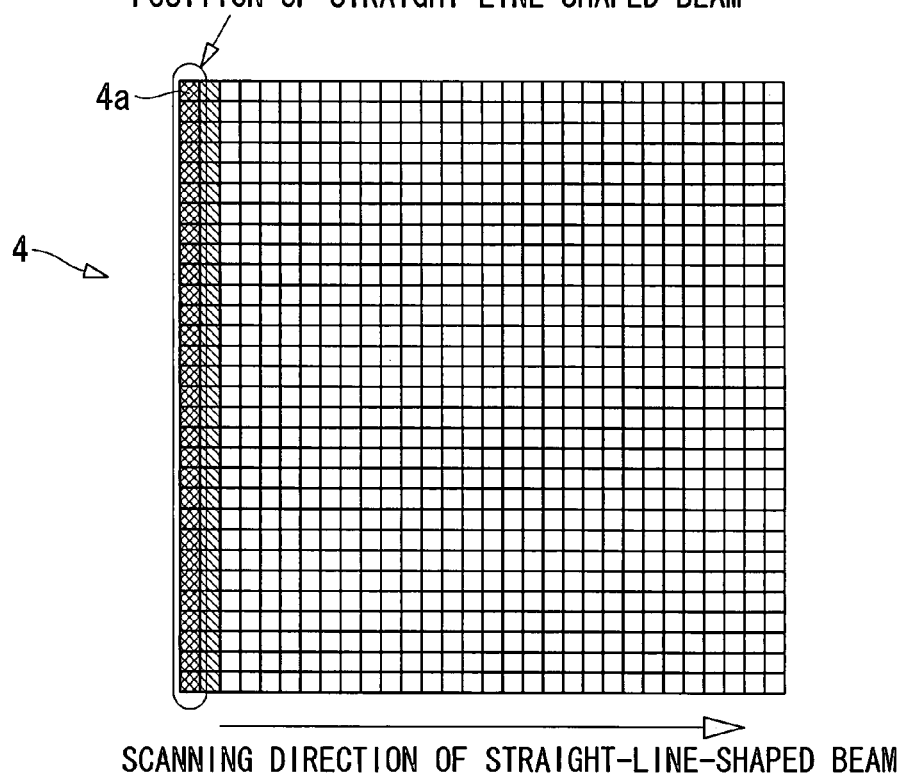
Figure 4B:
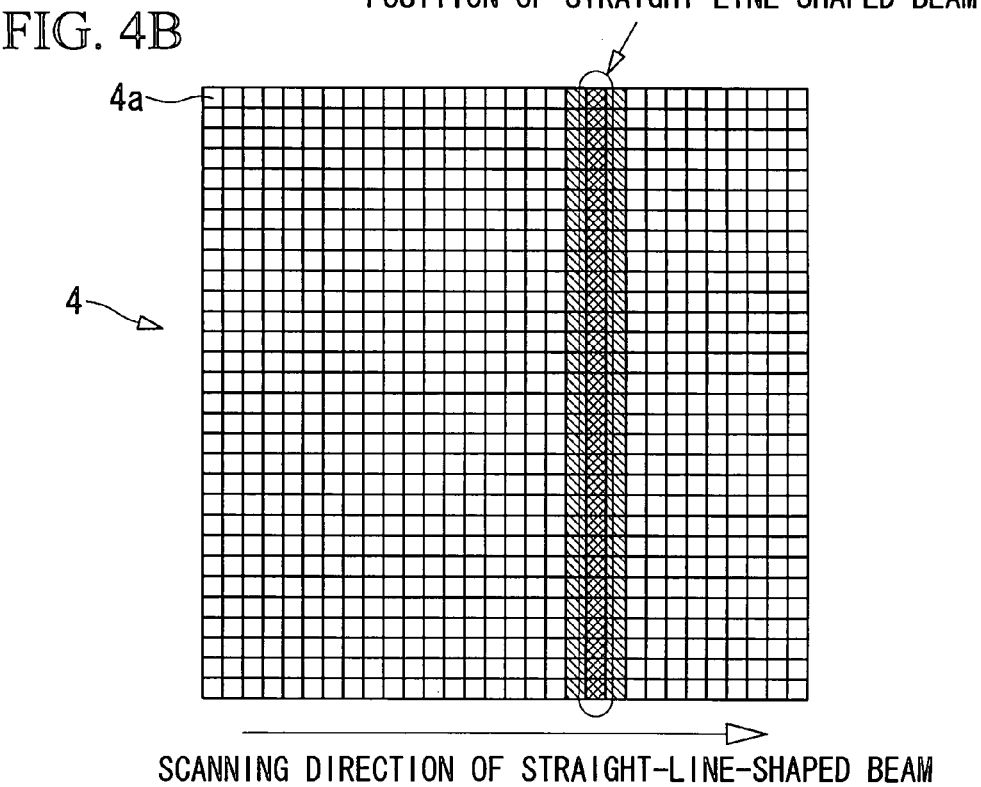
Figure 5A:
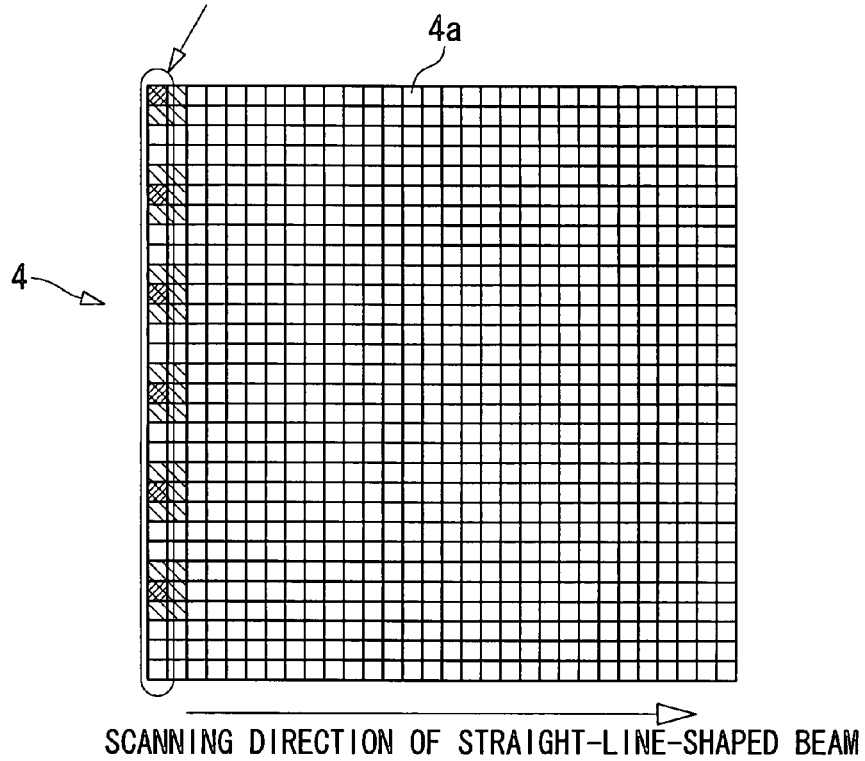
Figure 5B:
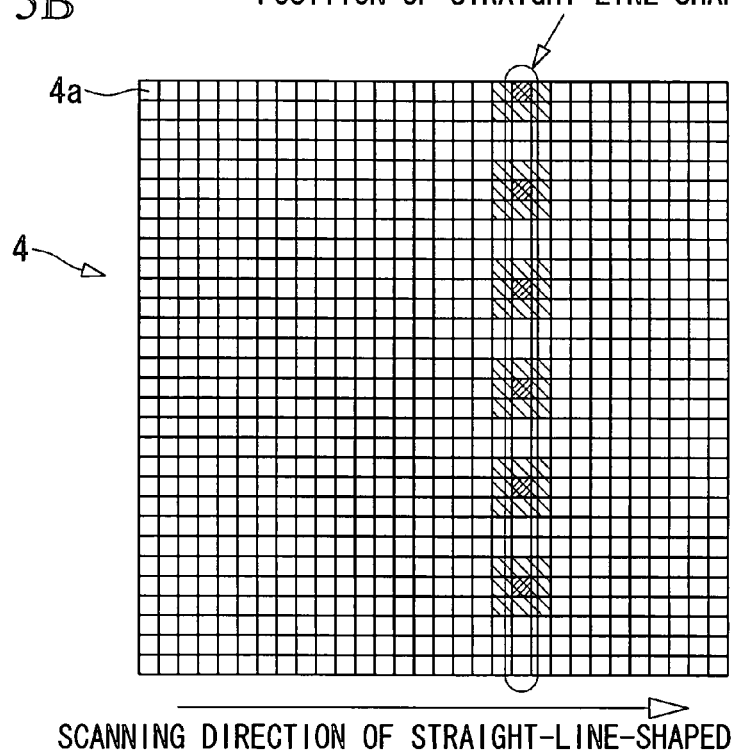

In this case, as shown in FIG. 3A and FIG. 3B, the shaded mirror elements 4a are turned on to perform a first scan, then the mirror elements 4a to be turned on next are shifted one row, as shown in FIG. 3C and FIG. 3D, to perform a second scan. When this is repeated five times, scanning of one screen is completed. Accordingly, it is possible to acquire an image exhibiting a confocal effect also with respect to the longitudinal direction of the line beam.

In this embodiment, turning on only the column of mirror elements 4a where the straight-line-shaped laser light $L_1$ is imaged makes the digital mirror array device 4 function as a confocal pinhole. However, as shown by the hatching in FIGS. 4A to 5B, it is possible to simultaneously turn on not only the mirror elements 4a at the image-forming position, but also one or more columns of surrounding mirror elements 4a neighboring them. By doing so, although the confocal effect is reduced, an advantage is afforded in that it is possible to acquire a bright fluorescence image whose depth of field is increased according to the brightness of the specimen.

In the confocal microscope 1 according to this embodiment, the laser light $L_1$ scanned by the light scanning unit 2 is made incident on the cylindrical lens 3. Instead of this, however, as shown in FIG. 6A and FIG. 6B, the cylindrical lens 3 may be disposed at the laser light source side of the light scanning unit 2. With this configuration, the laser light $L_1$ incident on the cylindrical lens 3 does not move, and therefore only good on-axis performance of the cylindrical lens 3 need be ensured. Therefore, an advantage is afforded in that it is possible to simplify the optical design. Reference numeral 15 in the drawing is a relay lens.

Figure 7A:
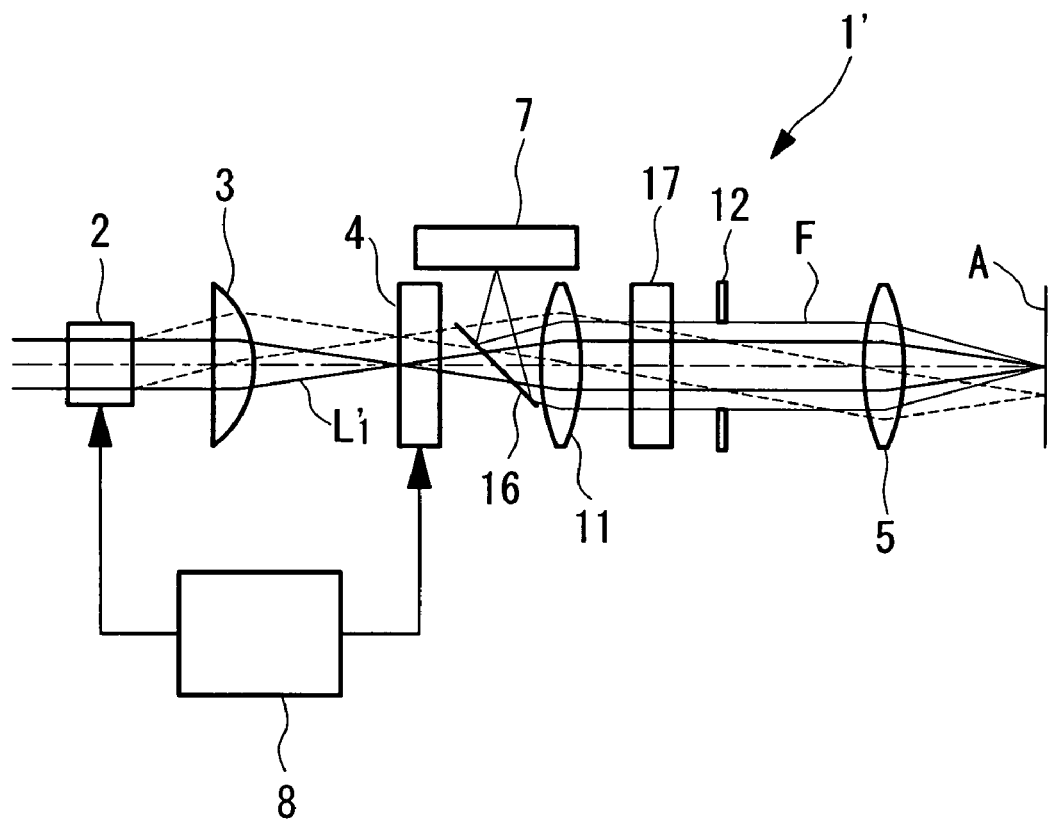
Figure 7B:
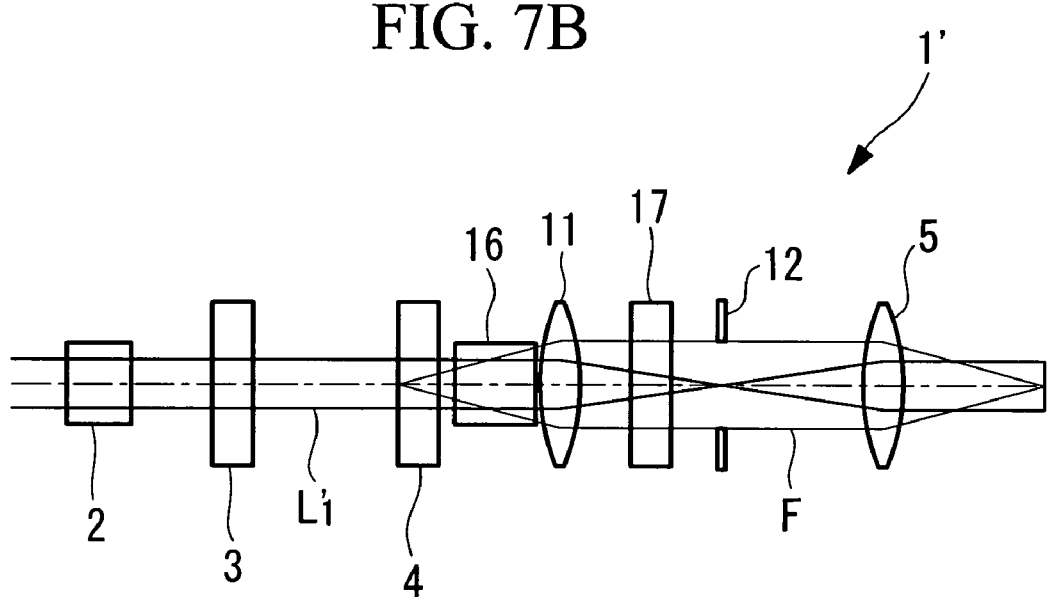

In this embodiment, in the confocal microscope 1 formed by detecting the fluorescence F from the specimen A after traveling via the digital mirror array device 4, the digital mirror array device 4 functions as a confocal pinhole. Instead of this, it is possible to construct a multiphoton excitation microscope 1' in which an ultrashort pulsed laser light source (not shown in the drawing) that emits ultrashort pulses of laser light $L_{1'}$ is used, and as shown in FIG. 7A and FIG. 7B, the fluorescence F is split off by a dichroic mirror 16 disposed between the image-forming lens 11 and the digital mirror array device 4, before it returns to the digital mirror array device 4, and is acquired by the two-dimensional CCD 7. With this configuration, due to a multiphoton excitation effect, it is possible to acquire a clearer and brighter multiphoton-excitation fluorescence image.

As shown in FIG. 7A and FIG. 7B, a wavefront conversion device (deformable mirror) 17 may be disposed between the dichroic mirror 16 and the objective lens 5. With this configuration, the focal plane of the objective lens 5 can be moved in the optical axis direction, which allows a three-dimensional fluorescence image of the specimen A to be acquired.

Figure 8A:
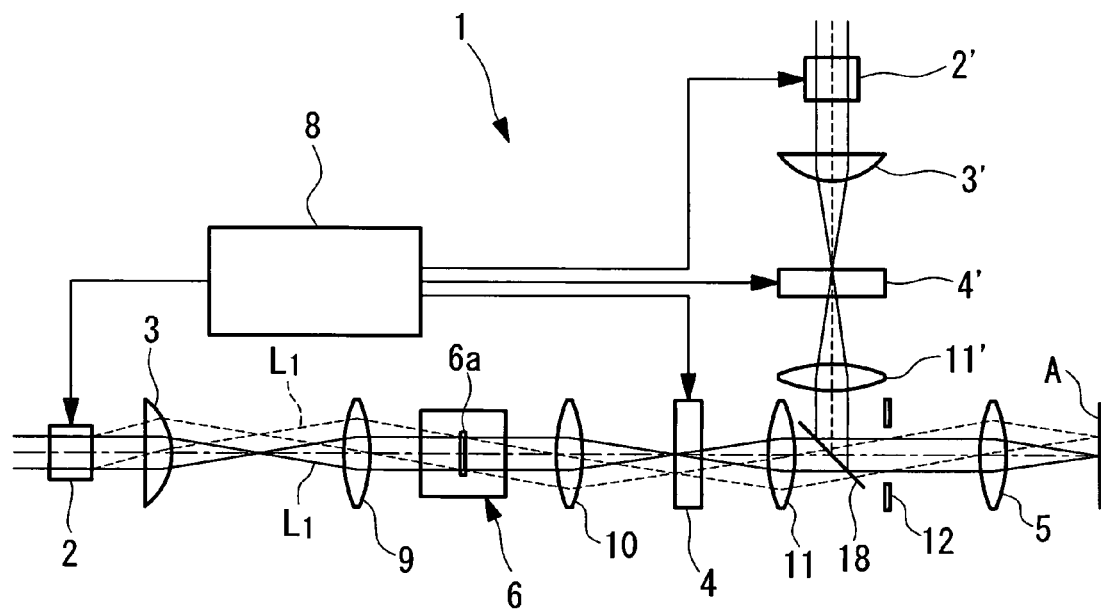
Figure 8B:
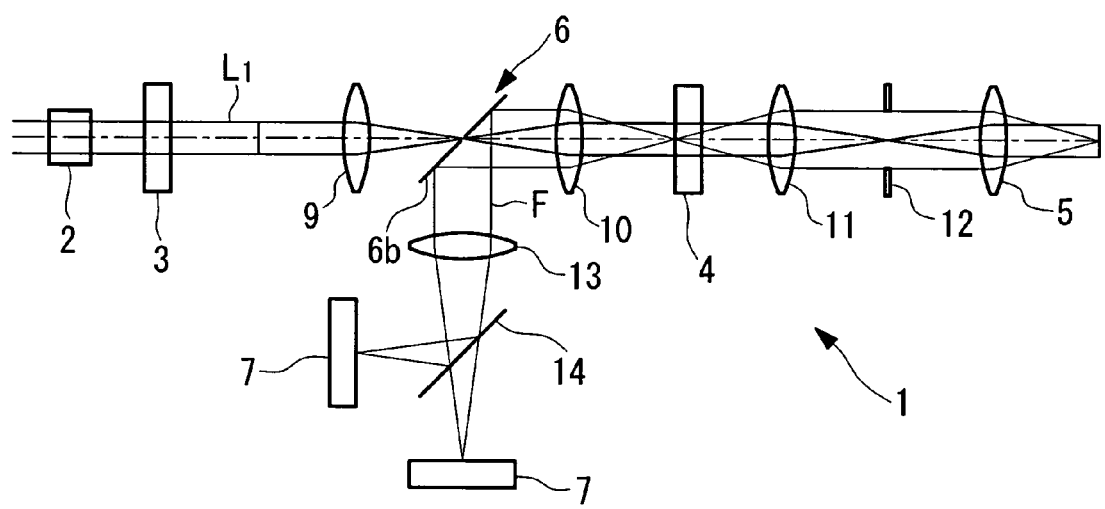

As shown in FIG. 8A and FIG. 8B, a dichroic mirror 18 may be disposed in a collimated light path between the image-forming lens 11 and the objective lens 5 for combining optical-stimulus laser light $L_2$ with the observation laser light $L_1$. The optical-stimulus laser light $L_2$, like the observation laser light $L_1$, travels along a path via a light-scanning unit 2' formed of an acousto-optic scanner, a cylindrical lens 3', a digital mirror array device 4', and an image-forming lens 11', is reflected by the dichroic mirror 18, and irradiates the specimen A.

Figure 9:
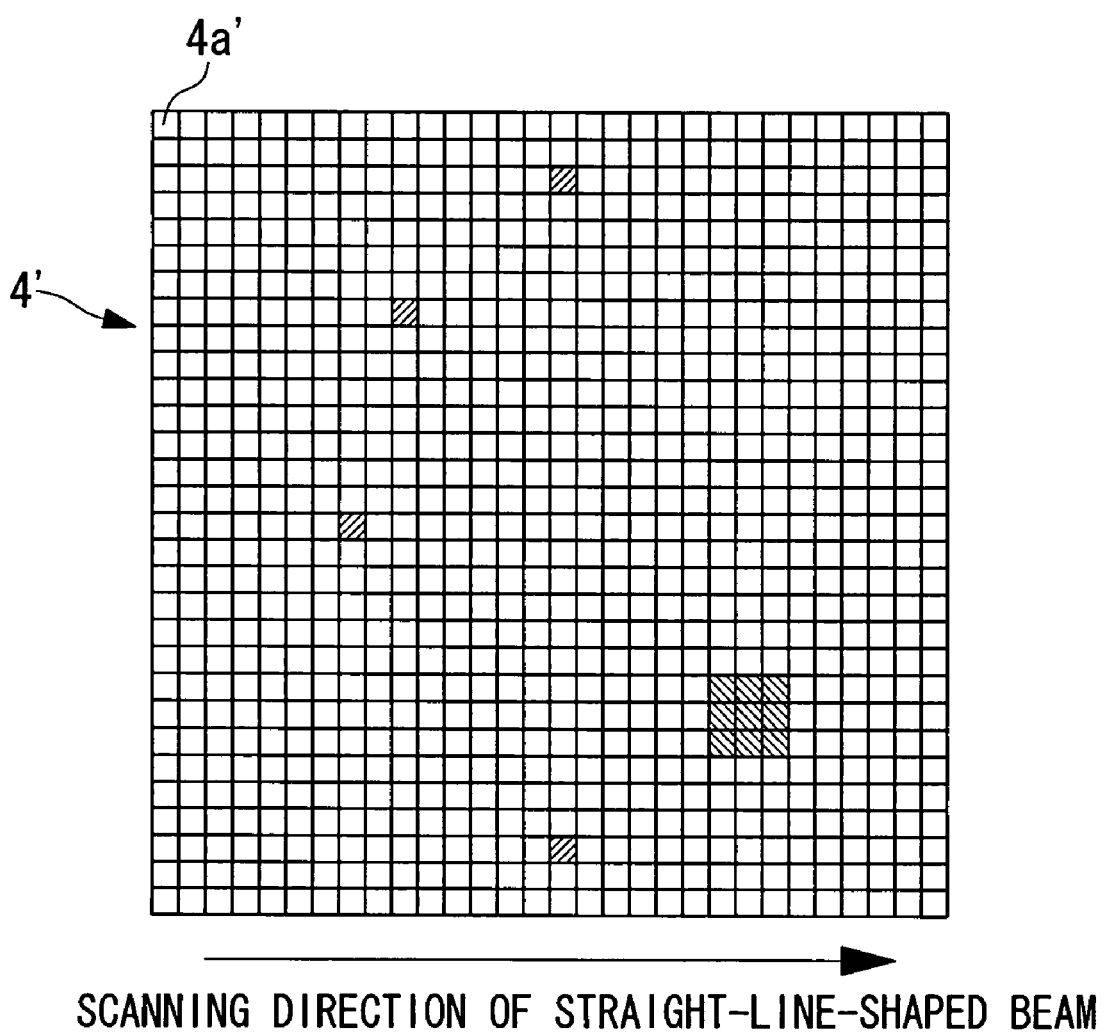
FIG. 9 shows an operating state of the digital mirror array device during optical stimulation with the configuration in FIG. 8A and FIG. 8B.

Because the digital mirror array device 4' is conjugate with respect to the specimen A, it is possible to radiate the laser light $L_2$ only at positions on the specimen A corresponding to the mirror elements 4a that are turned on. In other words, by using the control unit 8 to turn on the mirror elements 4a' corresponding to locations on the specimen A to be irradiated with stimulus light (any two-dimensional positions that are separated from each other, such as a plurality of points or areas; indicated by the shading in FIG. 9) and scan the line illumination using the acousto-optic scanner 2', the stimulus light $L_2$ is guided towards the specimen A only at the positions of the mirror elements 4a' indicated by the shading in FIG. 9. By doing so, it is possible to quickly apply the optical stimulus to a plurality of arbitrary locations (points or areas). Furthermore, the degree of freedom for setting the stimulus positions is increased.

Figures 10A, 10B:
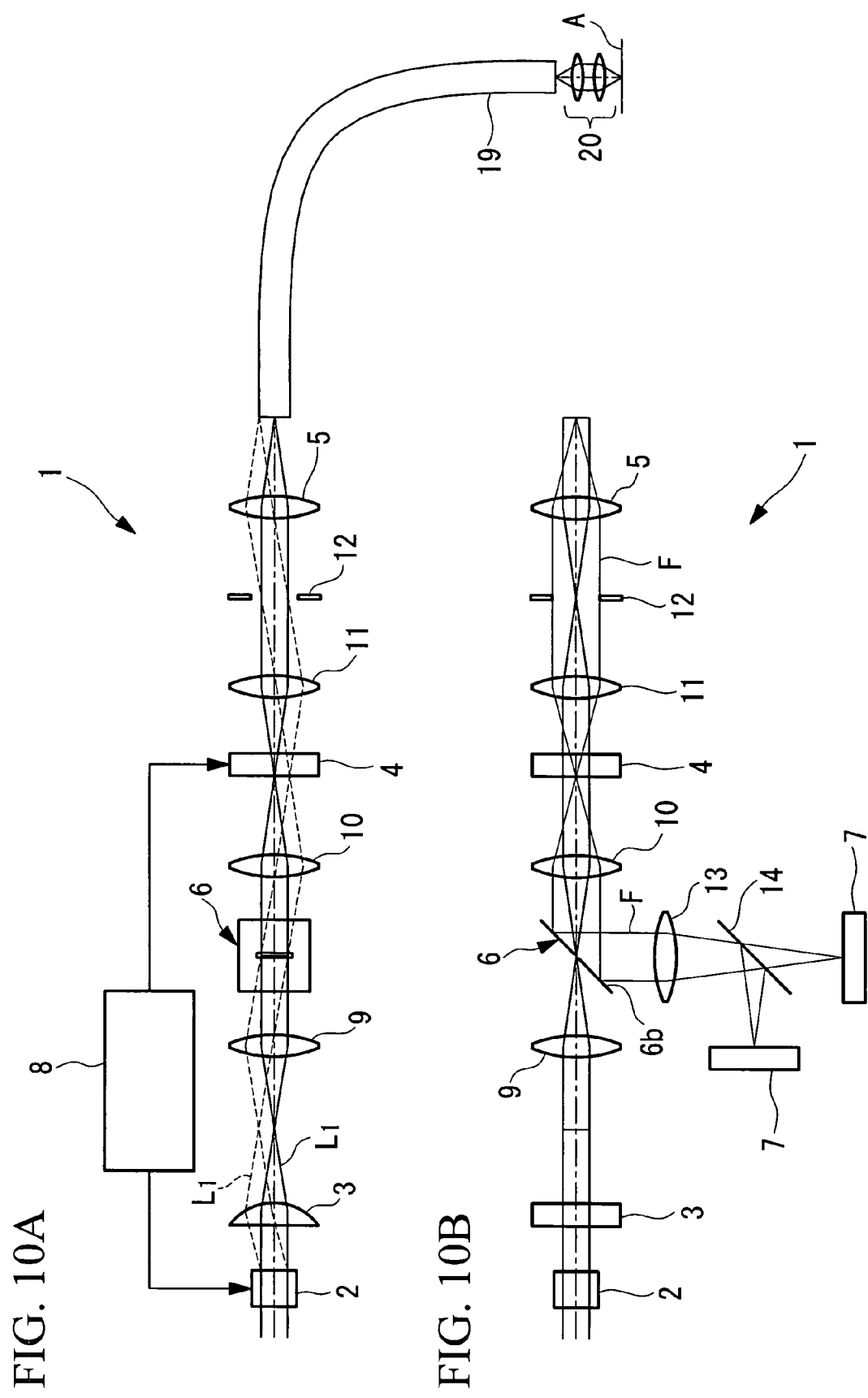

As shown in FIG. 10A and FIG. 10B, the focal plane of the objective lens 5 may be aligned with one end of an image guide 19, and a small objective optical system 20 may be disposed at the other end of the image guide 19. With this configuration, the tip of the image guide 19 can be inserted inside a specimen such as a living organism, allowing in vivo examination to be carried out.

Instead of the digital mirror array device, it is possible to use a device in which elements whose light reflection (transmission) state can be electrically controlled are two-dimensionally arrayed, for example, a liquid crystal matrix array.

What is claimed is:

1. A confocal microscope comprising:
    a light source;
    a light scanning unit configured to scan illumination light from the light source in one direction on a specimen;
    an array device in which are two-dimensionally arrayed a plurality of elements whose light reflecting or transmitting state can be electrically controlled;
    a line-beam generating unit configured to image, on the array device, the illumination light from the light source in the form of a straight line extending in a direction intersecting a scanning direction of the light scanning unit;
    an objective lens configured to image the illumination light reflected or transmitted at the array device on the specimen;
    a beamsplitter, between the array device and the light scanning unit, configured to split off from the illumination light detection light returning from the specimen via the objective lens and the array device;
    a two-dimensional image-acquisition unit configured to acquire the detection light split off by the beamsplitter; and
    a control unit configured to control the light scanning unit and the array device,
    wherein the array device is disposed in an optically conjugate positional relationship with a focal plane of the objective lens, and
    the control unit performs control so as to synchronize the light scanning unit and the array device.

2. A confocal microscope according to claim 1, wherein the beamsplitter is disposed in an optically conjugate position with respect to a pupil position of the objective lens and spatially separates the illumination light and the detection light.

3. A confocal microscope according to claim 1, wherein the control unit controls the array device so that elements where the straight-line-shaped beam is imaged and elements close thereto are in the same operating state.

4. A confocal microscope according to claim 1, wherein the line-beam generating unit is formed of a cylindrical lens, and the cylindrical lens is disposed on the light source side of the light scanning unit.

5. A confocal microscope according to claim 1, wherein after the control unit activates only some of the elements corresponding to the position where the straight-line-shaped beam is imaged on the array device and scans the straight-line-shaped beam, the control unit activates elements different from the activated elements and scans the straight-line-shaped beam.

6. A confocal microscope according to claim 1, further comprising a wavefront converting device, between the array device and the objective lens, configured to adjust a focal position on the specimen in an optical axis direction.

7. A confocal microscope according to claim 1, further comprising:
- a second light scanning unit configured to scan stimulus light, for irradiating the specimen, in one direction on the specimen;
- a second array device in which are two-dimensionally arrayed a plurality of elements whose light reflecting or transmitting state can be electrically controlled;
- a second line-beam generating unit configured to image the stimulus light, on the second array device, in the form of a straight line extending in a direction intersecting the scanning direction of the second light scanning unit;
- an optical component configured to establish a conjugate relationship between the second array device and a focal plane of the objective lens; and
- a second control unit configured to control the operating states of each element in the second array device, wherein by scanning the line beam with the second light scanning unit, the stimulus light is radiated at positions on the specimen that correspond to activated elements in the second array device.

8. A multiphoton excitation microscope comprising:
an ultrashort pulsed laser light source;
a light scanning unit configured to scan ultrashort pulsed laser light from the ultrashort pulsed laser light source in one direction on a specimen;
an array device in which are two-dimensionally arrayed a plurality of elements whose light reflecting or transmitting state can be electrically controlled;
a line-beam generating unit configured to image, on the array device, the ultrashort pulsed laser light from the ultrashort pulsed laser light source in the form of a straight line extending in a direction intersecting the scanning direction of the light scanning unit;
an objective lens configured to image, on the specimen, the ultrashort pulsed laser light reflected or transmitted at the array device;
a beamsplitter, between the objective lens and the array device, configured to split off fluorescence generated in the specimen and collected by the objective lens;
a two-dimensional image-acquisition unit configured to acquire the fluorescence split off by the beamsplitter; and
a control unit configured to control the light scanning unit and the array device,
wherein the array device is disposed in an optically conjugate positional relationship with a focal plane of the objective lens, and
the control unit performs control so as to synchronize the light scanning unit and the array device.

* * * * *